US006690617B2

United States Patent
Cribbs

(10) Patent No.: US 6,690,617 B2
(45) Date of Patent: Feb. 10, 2004

(54) APPLICATION OF SONIC SIGNALS TO DETECT BURIED, UNDERGROUND UTILITIES

(75) Inventor: Robert W. Cribbs, Placerville, CA (US)

(73) Assignee: Gas Research Institute, Des Plaines, IL (US)

(*) Notice: Subject to any disclaimer, the term of this patent is extended or adjusted under 35 U.S.C. 154(b) by 0 days.

(21) Appl. No.: 09/904,434

(22) Filed: Jul. 12, 2001

(65) Prior Publication Data

US 2002/0172093 A1 Nov. 21, 2002

Related U.S. Application Data

(60) Provisional application No. 60/292,046, filed on May 18, 2001.

(51) Int. Cl.[7] ............................................... G01S 15/00
(52) U.S. Cl. ........................................................ 367/99
(58) Field of Search .............................. 367/103, 11, 7, 367/99; 73/602, 594, 598

(56) References Cited

U.S. PATENT DOCUMENTS

4,332,016 A * 5/1982 Berntsen ........................ 367/7
5,808,969 A * 9/1998 Arnaud et al. .............. 367/103

FOREIGN PATENT DOCUMENTS

| DE | 3002262 | * | 1/1980 | ............ G01S/15/88 |
| JP | 6050415 | * | 3/1985 | ............ G01D/21/00 |

* cited by examiner

Primary Examiner—Daniel T. Pihulic
(74) Attorney, Agent, or Firm—Mark E. Fejer

(57) ABSTRACT

An apparatus and method for detecting utilities buried in the ground wherein an array of sonic receivers are arranged in rows and ranks against the ground and a corresponding array of sonic transmitters are arranged relative to the array of sonic receivers so that a distance between each sonic transmitter and each adjacent sonic receiver is the same. Echoes generated by the apparatus may then be normalized, averaged and compared to the original echoes to develop a profile of the buried utility.

20 Claims, 2 Drawing Sheets

APPLICATION OF SONIC SIGNALS TO DETECT BURIED, UNDERGROUND UTILITIES

CROSS REFERENCE TO RELATED APPLICATION

This application claims the benefit of U.S. Provisional Application No. 60/292,046, filed May 18, 2001.

BACKGROUND OF THE INVENTION

1. Field of the Invention

This invention relates to an apparatus and method for detecting buried objects using sonic energy.

2. Description of Related Art

The location of underground utilities, and in particular underground gas lines, are not well documented. Often, when digging trenches for new lines or using guided boring for installation of new lines, old utilities are broken. This not only interrupts service but can lead to serious or fatal accidents.

There are two categories of target utilities in the prior art: cooperative targets and uncooperative targets. If an underground utility creates, either artificially or normally, a signal to assist an operator in locating it, the target utility is cooperative. If the underground utility is passive, it is uncooperative. This invention is applicable to either cooperative or uncooperative targets but is particularly suited for uncooperative targets. Generally, the utility line may be metallic or plastic. This invention addresses both metallic and plastic utility lines.

If the utility line is metallic, a metal detector may be used. For shallow, large diameter metal pipe, the metal detector is quite effective. If the metal pipe has a small diameter and is deep, then it usually escapes detection. The sensitivity of metal detectors decreases with the inverse 6th power of distance. This means that if any particular pipe moves twice as far from the metal detector, the signal decreases by 1/64 and at 4 times the distance, the signal decreases by 1/4096. It is this sharp decrease in sensitivity with distance that limits the usefulness of metal detectors. Metal detectors do not detect non-metallic pipe or objects.

Ground Penetrating Radar (GPR) may be used to detect both metallic and non-metallic utilities. GPR uses microwave signals to detect such utilities. When GPR is properly used to detect utilities in soils that are relatively transparent, it can be quite effective. The problem with GPR is that there are vast regions, such as most or all of the State of Texas, where the soil is too opaque for microwave penetration by GPR to function. Moisture also attenuates microwave signals. Soils that can be penetrated with microwaves when dry become opaque after a rain.

A microwave transducer need not have intimate contact with the ground when obtaining measurements thereby allowing microwave transducers to be moved over soil at walking speeds. Another advantage of microwaves is that microwave signals propagate mainly in a transverse mode.

According to available information, a large percentage of soils are transparent to sonic signals. As such, this invention utilizes sonic energy in lieu of GPR (microwave signals) or metal detectors to locate underground utilities.

SUMMARY OF THE INVENTION

It is one object of this invention to detect, identify and/or map underground obstacles such as buried foundations, tanks, or other objects.

It is another object of this invention to provide a device that detects, identifies and/or maps underground obstacles using sonic signals.

It is another object of this invention to provide a device that utilizes an array of transducers positioned at a fixed position with respect to one another.

According to one preferred embodiment of this invention for mapping three-dimensional images, a device for detecting utilities buried in the ground preferably includes an array of sonic receivers arranged in rows and ranks and positioned against the ground and a corresponding array of sonic transmitters positioned against the ground and connected with respect to and interposed within the array of sonic receivers, each sonic transmitter of the corresponding array of sonic transmitters positioned equidistant from each directly adjacent sonic receiver of the array of sonic receivers.

Alternatively, in a preferred embodiment of this invention for mapping two-dimensional images, a linear array of sonic transmitters is positioned against the ground and a corresponding linear array of sonic receivers positioned against the ground and connected with respect to the linear array of sonic transmitters, each sonic receiver of the corresponding linear array of sonic receivers positioned a distance from each sonic transmitter of the linear array of sonic transmitters, the distance between each corresponding sonic receiver and sonic transmitter being equal.

The device according to this invention may additionally include a signal generator for producing a signal based upon an echo pattern between the array of sonic receivers and the corresponding array of sonic transmitters. In addition, the array of transducers may be positioned in communication with an amplifier for amplifying echoes generated by the array of sonic transmitters; a processor for processing the echoes into echo patterns; and/or a display for displaying the resultant echo patterns.

BRIEF DESCRIPTION OF THE DRAWINGS

The above-mentioned and other features and objects of this invention will be better understood from the following detailed description taken in conjunction with the drawings wherein.

DESCRIPTION OF PREFERRED EMBODIMENTS

Figure 1:
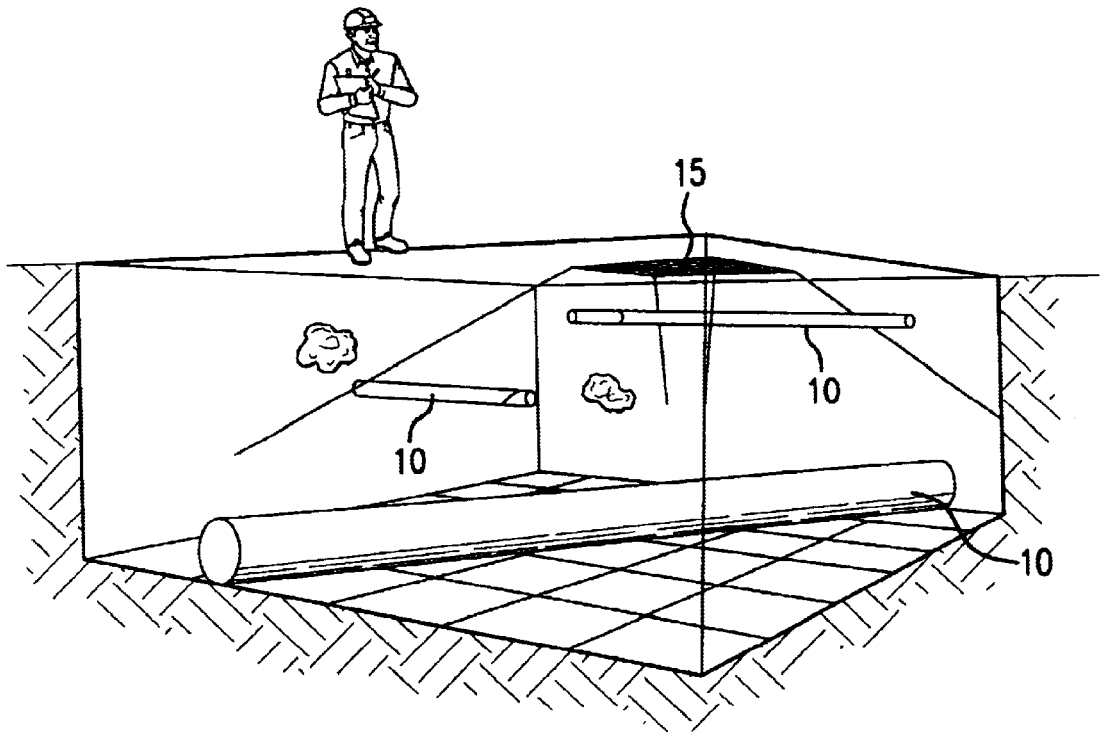
FIG. 1 is a schematic perspective view of the working environment for the device according to one preferred embodiment of this invention.

The attenuation of microwave and sonic signals can be directly compared with respect to the ability of each to detect a specific diameter pipe if each are compared at the same wavelength. For microwave signals, the wavelength in soil is: $\lambda m = c/nf$ where: $\lambda m$=wavelength of microwave signal in soil (cm); c=velocity of light ($3 \times 10^{10}$ cm/sec); n=refraction index of the soil (dimensionless); and f=frequency of the microwave signal (Hz). For sonic signals, the wavelength in soil is: $\lambda s = V/f$ where: $\lambda s$=wavelength of the sonic signal in soil (cm); V=velocity of propagation of the sonic signal (cm/sec); and f=frequency of the sonic signal (Hz). As a rule of thumb, the wavelength to detect plastic pipe using either microwave or sonics, must be longer than three times the diameter of the pipe.

The advantage of sonics may be precisely stated in view of the foregoing. At the wavelengths needed to detect pipe down to a small diameter (typically one inch), there are larger regions of the country where sonic signals have less attenuation than microwave signals. In particular, there are some soils where the microwave signals needed for the detection of small diameter pipes are attenuated to useless levels in a few inches, and no such soils have been found that so attenuate sonic signals. Sonics have additional advantages over microwaves. For instance, the sonic transducers needed to couple the waves into the earth are smaller than microwave transducers. This is especially important in applications where an array of elements are needed. Microwave signals intended to couple into the earth often propagate through the air to reflect off surface objects (cars, fences, etc.) and produce interference. This is much less severe for sonic signals.

There are three basic problems with the application of sonic signals to detecting small objects in shallow earth. First, when the sonic pulse is transmitted into the earth, a surface wave is also generated. This surface wave overwhelms the receiver transducers and obscures echoes from the underground objects. Second, uniform coupling of sonic transducers into the earth is difficult to obtain. Small rocks and other local conditions in the immediate vicinity of the transducer-to-soil contact area may cause this problem. Third, there may be variations in the velocity of transmission of sound in the earth within the imaged area.

An array of sonic transducers 15 may be used to gather accurate data because the displacement of each sonic transducer in an array can be used to compensate for surface irregularities at the point of measurement. Sonic signals propagate in a transverse mode, a longitudinal mode and a surface mode. Since each mode travels at a different propagation velocity and there is no direct way to identify which mode generates which echoes, data interpretation for sonic signals require more care.

Data interpretation involves observing echo patterns generated by sonic transducers 15 and interpreting them. Preferably, three-dimensional images or tomographic images can be rendered from the echo patterns which permit those having less skill in the art to interpret such echo patterns. Imaging algorithms similar to those used in medical phased-array imaging may be used to render readable output. These imaging algorithms require knowledge of the velocity of wave propagation and require that the propagation velocity be constant within the region being imaged. Within the human body, variation in velocity in soft tissue is a few percent. The variation from one soil to another can be 100%. This variation alone is not a problem because the velocity in any particular soil can be estimated. The problem becomes more severe when there is a large velocity variation within the region of one image. It is relatively easy for those skilled in the art to interpret these results but the imaging algorithms may result in blurred images. A new method of data analysis may be required in cases with large velocity variations within one data set.

An image is made by using transducers 15 having sonic transmitters 20 and sonic receivers 30 on some pattern on the surface of the earth. If the pattern is along a straight line, a two-dimensional image can be rendered and if an area on the surface is covered, a three-dimensional image can be rendered. A preferable pattern is a line array wherein transducers 15 are equally spaced on a straight line for two-dimensional images. For three-dimensional images, a preferable pattern is a rectangular array.

There are at least three types of sonic transducers: transmitters that transmit sonic signals, receivers that receive sonic signals and transducers that both transmit and receive sonic signals. According to a preferred embodiment of this invention, different transducers 15 are used for transmitting and receiving. An image can be rendered by having one or more sonic transmitters 20 and an array of sonic receivers 30 or one or more sonic receivers 30 and an array of sonic transmitters 20.

One or more transmit locations may be used with an array of sonic receivers 30. Such an arrangement takes less time because only one or a few pulses need be transmitted with all sonic receivers 30 operating in parallel. If only one sonic receiver 30 is used, it would be necessary to sequence pulses to all the sonic transmitters 20, thus taking more time to collect the data for the image. In addition, sonic receivers 30 are generally less expensive than sonic transmitters 20.

In such arrangements, the distance from the sonic transmitter 20 and each sonic receiver 30 in the array is different, and the surface wave produces a different signal pattern in each sonic receiver 30. It might seem that the surface wave pattern in each sonic receiver 30 would have the same shape and be displaced in time in proportion to the distance between each sonic receiver 20 and the sonic transmitter 30. The patterns differ more significantly because surface waves are dispersive, that is, each frequency component travels at a different speed (unlike the sonic waves that travel within the soil). Each frequency component is also attenuated differently according to distance between sonic transmitter 20 and sonic receiver 30. The resulting plurality of received signals further vary because of variations in transducer coupling and inhomogeneous surface conditions.

According to a preferred embodiment of this invention, the distance between each sonic transmitter 20 and sonic receiver 30 is the same. This makes the surface wave identical in each sonic receiver 30, subject to coupling variations and surface inhomogeneities. The surface wave signal can then be identified and subtracted or otherwise eliminated to yield the weaker echoes from underground objects.

According to a preferred embodiment of this invention, the sonic transmitter 20 and sonic receiver 30 are placed relatively close together. This permits the surface wave to pass the sonic receiver 30 before echoes within the earth arrive. The surface wave travels slower than the imaging waves so the sonic transmitter 20 and sonic receiver 30 must be much closer with respect to one another than the distance from the surface to the object to be imaged.

Accordingly, a pattern of sonic transmitters 20 and sonic receivers 30 are arranged in an array wherein the distance on the surface of the earth between each pair of sonic transmitters 20 and sonic receivers 30 that produce each echo pattern is the same. More preferably, the distance between each pair of sonic transmitters 20 and sonic receivers 30 is smaller than a depth of the object to be imaged. Alternatively, there may be several, rather than one, distances between each pair of sonic transmitters 20 and sonic receivers 30.

According to one preferred embodiment of this invention, a device for detecting utilities buried in the ground includes an array of sonic transducers 15 positioned against the ground which generate a transmitted signal. Actuator 50 is preferably positioned in communication with the array of sonic transducers and actuates the transmitted signal. Amplifier 60 preferably amplifies echoes generated by the transmitted signal and preferably directs such amplified echoes to processor 70 for processing the echoes generated by the transmitted signal into echo patterns. For ease of use of the device, display 80 preferably displays the resultant echo patterns in a manner that is easily interpreted.

Figure 2:
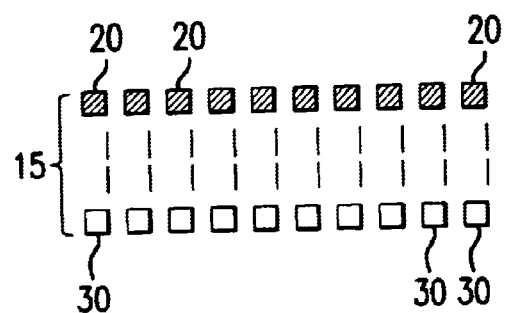
FIG. 2 is a schematic top view of an array of transducers according to one preferred embodiment of this invention.
Figure 3:
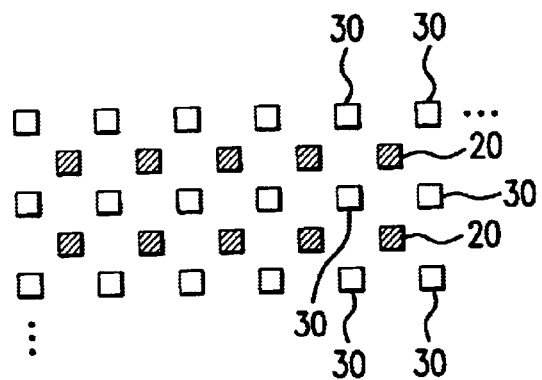
FIG. 3 is a schematic top view of an array of transducers according to one preferred embodiment of this invention.
Figure 4:
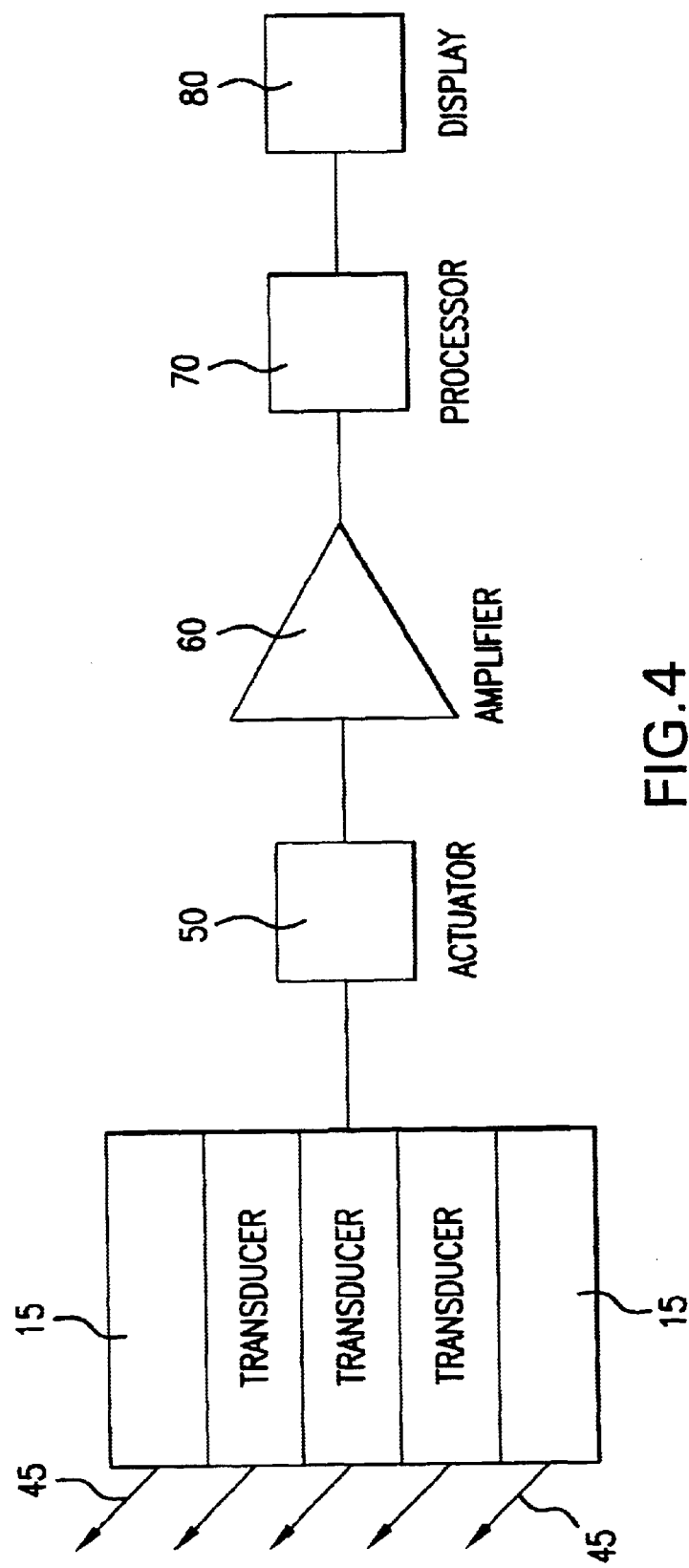
FIG. 4 is a schematic diagram of a device according to one preferred embodiment of this invention.

As shown in FIGS. 2 and 3, the array is preferably arranged in a matrix pattern. In such a matrix pattern, sonic transducers 15 may both transmit and receive sonic signals; may transmit only and further include one or more sonic receivers 30 for receiving the transmitted signal; or may further include one or more sonic transmitters 20 and one or more sonic receivers 30.

According to one preferred embodiment of this invention, sonic transducers 15 are spaced apart from each other less than one wavelength. An additional preferable distance between sonic transmitters 20 and sonic receivers 30 is less than a depth of the utility buried in the ground.

According to a preferred embodiment of this invention for generating two-dimensional images, two linear transducer arrays are arranged wherein one is a sonic transmitter 20 and one is a sonic receiver 30. Each corresponding pair of sonic transmitters 20 and sonic receivers 30 within the two linear transducer arrays is preferably the same distance apart from each other. A linear array of sonic transmitters 20 are preferably positioned against the ground and a corresponding linear array of sonic receivers 30 are also preferably positioned against the ground and connected with respect to the linear array of sonic transmitters 20. As shown schematically in FIG. 2, each sonic receiver 30 of the corresponding linear array of sonic receivers 30 is positioned a distance from each sonic transmitter 20 of the linear array of sonic transmitters 20 to form a pair. The distance between each sonic transmitter 20 and sonic receiver 30 pair is equal.

As shown schematically in FIG. 3, according to a preferred embodiment of this invention for generating three-dimensional images, an array of sonic receivers 30 are arranged in rows and ranks and positioned against the ground. A corresponding array of sonic transmitters 20 are preferably positioned against the ground and connected with respect to and interposed within the array of sonic receivers 30. Each sonic transmitter 20 of the corresponding array of sonic transmitters 20 is additionally positioned equidistant from each directly adjacent sonic receiver 30 of the array of sonic receivers 30.

According to one preferred embodiment of this invention, one or more switches 45 are connected with respect to the array of sonic transducers 15 for providing a selectable on/off condition for at least one sonic transmitter 20 of the corresponding array of sonic transmitters 20.

Regardless of whether the device is used in connection with two-dimensional or three-dimensional analysis, the device may additionally include signal generator 40 for producing a signal based upon an echo pattern between the array of sonic receivers 30 and the corresponding array of sonic transmitters 20. The device may further include amplifier 60 for amplifying echoes generated by the linear array of sonic transmitters 20 and processor 70 for processing the echoes into echo patterns. Finally, display 80 may be used for rendering and/or displaying echo patterns that are interpreted by users having ordinary skill in the art.

According to a preferred method of operation for detecting a utility buried in the soil, a sonic signal is sent into the soil using a transducer array and a return signal is subsequently processed to determine a location of the utility. An x, y and z grid may be established with the transducer array and the x-y position of each transmitting element and each recording element may be recorded to establish a reference for the resulting return signals.

A return signal created by an echo of the sonic signal is thereafter processed to determine a location of the utility. According to one preferred embodiment of this invention, the echo received by each sonic receiver 30 of the array is normalized. An average of the normalized echoes received by each sonic receiver is then determined and compared the average of the normalized echoes to the return signal to eliminate distortion created by imperfections in the ground.

While in the foregoing specification this invention has been described in relation to certain preferred embodiments thereof, and many details have been set forth for purpose of illustration, it will be apparent to those skilled in the art that the method and apparatus according to this invention is susceptible to additional embodiments and that certain of the details described herein can be varied considerably without departing from the basic principles of the invention.

I claim:

1. A device for detecting utilities buried in the ground comprising:

an array of a plurality of sonic transmitters generating a transmitted signal and a plurality of sonic receivers spaced apart from said sonic transmitters positioned against the ground, each said sonic receiver associated with a corresponding said sonic transmitter;

an actuator for actuating the transmitted signal;

an amplifier for amplifying echoes generated by the transmitted signal;

a processor for processing the echoes generated by the transmitted signal into echo patterns; and a display for displaying the echo patterns.

2. The device of claim 1 wherein the array is arranged in a matrix pattern.

3. The device of claim 1 wherein the array is a one-dimensional array.

4. The device of claim 1 wherein the sonic transmitters and sonic receivers are spaced apart from each other by less than one wavelength.

5. The device of claim 1 wherein the each said sonic transmitter and its associated sonic receiver constitute a transmitter/receiver pair, each said transmitter/receiver pair spaced apart an equal distance from each other transmitter/receiver pair.

6. The device of claim 5, wherein a distance between each said transmitter/receiver pair is less than a depth of the utility buried in the ground.

7. A method for detecting utilities buried in the ground comprising:

positioning an array of sonic receivers arranged in rows and ranks against the ground; and positioning a corresponding array of separate sonic transmitters against the ground and relative to the array of sonic receivers so that a distance between each adjacent sonic receiver of the array of sonic receivers and each sonic transmitter of the array of sonic transmitters is equal.

8. The method of claim 7 further comprising:

sending a sonic signal into the ground using the array of sonic transmitters;

processing a return signal created by an echo of the sonic signal to determine a location of the utility.

9. The method of claim 8 further comprising:

normalizing the echo received by each sonic receiver of the array of sonic receivers;

determining an average of the normalized echoes received by each sonic receiver; and comparing the average of the normalized echoes to the return signal to eliminate distortion created by imperfections in the ground.

10. A device for detecting utilities buried in the ground comprising:

an array of sonic receivers arranged in rows and ranks and positioned against the ground; and a corresponding array of separate sonic transmitters positioned against the ground and connected with respect to and interposed within the array of sonic receivers, each sonic transmitter of the corresponding array of sonic transmitters positioned equidistant from each directly adjacent sonic receiver of the array of sonic receivers.

11. The device of claim 10 further comprising:

a signal generator for producing a signal based upon an echo pattern between the array of sonic receivers and the corresponding array of sonic transmitters.

12. The device of claim 10 further comprising:

one or more switches for providing a selectable on/off condition for at least one sonic transmitter of the corresponding array of sonic transmitters.

13. The device of claim 10 wherein each sonic transmitter is positioned at a distance from each directly adjacent sonic receiver less than a depth of the utility buried in the ground.

14. The device of claim 10 further comprising:

an amplifier for amplifying echoes generated by the array of sonic transmitters;

a processor for processing the echoes into echo patterns; and a display for displaying echo patterns.

15. A device for detecting a utility buried in soil comprising:

a linear array of sonic transmitters positioned against the ground;

a corresponding linear array of sonic receivers positioned against the ground and connected with respect to the linear array of sonic transmitters, each sonic receiver of the corresponding linear array of sonic receivers positioned a distance from each sonic transmitter of the linear array of sonic transmitters, the distance between each corresponding sonic receiver and sonic transmitter being equal.

16. The device of claim 15 further comprising:

a signal generator for producing a signal based upon an echo pattern between the array of sonic receivers and the corresponding array of sonic transmitters.

17. The device of claim 15 wherein the distance is less than a depth of the utility buried in the ground.

18. The device of claim 15 further comprising:

an amplifier for amplifying echoes generated by the linear array of sonic transmitters;

a processor for processing the echoes into echo patterns; and a display for displaying echo patterns.

19. A method or detecting a utility buried in soil comprising:

sending a sonic signal into the soil using an array of a plurality of sonic transmitters;

processing a return signal received by a plurality of sonic receivers spaced apart from said sonic transmitters, where each said sonic transmitter is associated with a corresponding said sonic eceiver to determine a location of the utility.

20. The method of claim 19 further comprising:

establishing an x, y and z grid with the array; and recording the x-y position o each transmitting element and each recording element.

* * * * *